US012447481B2

United States Patent

Wang

(10) Patent No.: US 12,447,481 B2
(45) Date of Patent: Oct. 21, 2025

(54) NOZZLE STRUCTURE WITH FORWARD AND REVERSE WATER SEALING

(71) Applicant: NINGBO YANGTENG XINGYE MACHINERY CO., LTD, Zhejiang (CN)

(72) Inventor: Cheng-Yu Wang, Zhejiang (CN)

(73) Assignee: NINGBO YANGTENG XINGYE MACHINERY CO., LTD, Ningbo (CN)

( * ) Notice: Subject to any disclaimer, the term of this patent is extended or adjusted under 35 U.S.C. 154(b) by 358 days.

(21) Appl. No.: 18/172,287

(22) Filed: Feb. 21, 2023

(65) Prior Publication Data

US 2024/0278265 A1 Aug. 22, 2024

(51) Int. Cl.
*B05B 1/30* (2006.01)
*F16J 15/16* (2006.01)

(52) U.S. Cl.
CPC ............. *B05B 1/3033* (2013.01); *F16J 15/16* (2013.01)

(58) Field of Classification Search
CPC ........... B05B 1/3033; B05B 1/32; B05B 1/30; B05B 1/3013; B05B 1/12; B05B 1/1663; B05B 1/3452; B05B 9/01; A62C 31/02; A62C 31/05; A62C 31/03; B05C 5/02
USPC .................................................. 239/456, 259
See application file for complete search history.

(56) References Cited

U.S. PATENT DOCUMENTS 6,254,013 B1 * 7/2001 Clearman ............. B05B 3/0486 239/389
2013/0092762 A1 * 4/2013 Kikuchi ................ B05B 1/3033 239/569

* cited by examiner

*Primary Examiner* — Christopher R Dandridge

(57) ABSTRACT

A nozzle structure with forward and reverse water sealing, comprising a nozzle head, a cover, and a plurality of sealing rings. The two ends of the nozzle head are the water-filling end and the spraying end respectively, a drainage aperture is pierced on the side of the spraying end, a guide cone is provided at the upper end, and a stopper is installed convexly on the outer periphery at the end portion of spraying end. The cover is sleeved on the nozzle head, which can rotate forwardly and reversely. The sealing rings are set on the nozzle head and the cover respectively. When the cover is rotated to the forward or reverse end, both ends of the cover can be sealed by the sealing rings to seal off the water.

5 Claims, 7 Drawing Sheets

NOZZLE STRUCTURE WITH FORWARD AND REVERSE WATER SEALING

FIELD OF THE INVENTION

The present invention relates to a nozzle for spraying liquid, more particularly, a nozzle structure that can seal the water when rotated to the end position in a forward or reverse direction.

BACKGROUND OF THE INVENTION

It is known that a general sprinkler is composed of at least a nozzle and a water pipe (not shown), the nozzle comprises a nozzle head A and a nozzle cover B, wherein the rear end of the nozzle head A is connected to the water pipe and the front end is provided with at least one water outlet A1, also a guiding member A2 is installed at the front end; the front end of the nozzle cover B has at least one water spout B1, and the nozzle cover B is sleeved on the nozzle head A which can be rotated on the nozzle head A to adjust the relative distance between the guiding member A1 of the nozzle head A and the water spout B1, so that the water sprayed from the water spout B1 can be adjusted back and forth between scattering or direct-jetting, meanwhile; a sealing washer B2 (as shown in FIGS. 1 and 2) is provided at the inner side of the front end of the nozzle cover B, when the nozzle cover B is rotated to the end corresponding to the nozzle head A, the front end of the nozzle head A will be closely attached to the sealing washer B2 inside the nozzle cover B, which can achieve the effect of sealing off the water flow.

However, when the user has adjusted the nozzle cover B to the direct water jet with maximum volume and required it to be turned off, the nozzle cover B will have to be rotated back to the end position corresponding to the nozzle head A, so it cannot be turned off immediately, and if the user is not familiar with the nozzle and tries to adjust the nozzle cover B from a small volume of the scattering water to the maximum volume of the direct water jet, but still cannot turn off the water flow, later found out that it has been turned in the wrong direction and has to rotate the nozzle cover B back to the end position corresponding to the nozzle head A again, which is really time-consuming and laborious.

Therefore, how to improve the above deficiencies and provide a nozzle structure or device that can be turned off immediately is a technical issue that the inventor of the present disclosure intends to solve.

SUMMARY OF THE INVENTION

The purpose of the present disclosure is to provide a nozzle structure with forward and reverse water sealing, which is composed of at least a nozzle head, a cover, and a plurality of sealing rings. The two ends of the nozzle head are the water-filling end and the spraying end respectively, wherein, at least one drainage aperture is pierced on the side of the spraying end and a guide cone is provided at the upper end of the spraying end, a stopper is installed convexly on the outer periphery at the end portion of the spraying end, and the cover is sleeved on the nozzle head which is able to rotate forwardly and reversely. The sealing rings are divided into at least first, second, and third sealing rings and are set on the nozzle head and the cover respectively. The first sealing ring is set relatively on the rear of the drainage aperture of the nozzle head and can be attached to the inner side of the cover, the second sealing ring is set relatively between the upper end of the spraying end of the nozzle head and the guide cone and can be attached to the water spout of the cover correspondingly, and the third sealing ring is set relatively on the inner middle section of the cover and can be attached to the stopper of the nozzle head. When the cover is rotated to the forward end or reverse end on the nozzle head, both ends of the cover can be sealed by the first and second sealing rings or the first and third sealing rings to achieve the purpose of sealing off the water.

To achieve the above purpose, a screwed joint is provided on the outer side of the middle section of the nozzle head, and another screwed joint is provided on the bottom inner side of the cover, so that the cover can be sleeved on the nozzle head correspondingly and rotated forwardly and reversely to adjust the relative distance between the guide cone and the water spout.

DESCRIPTION OF THE PREFERRED EMBODIMENTS

Figure 1:
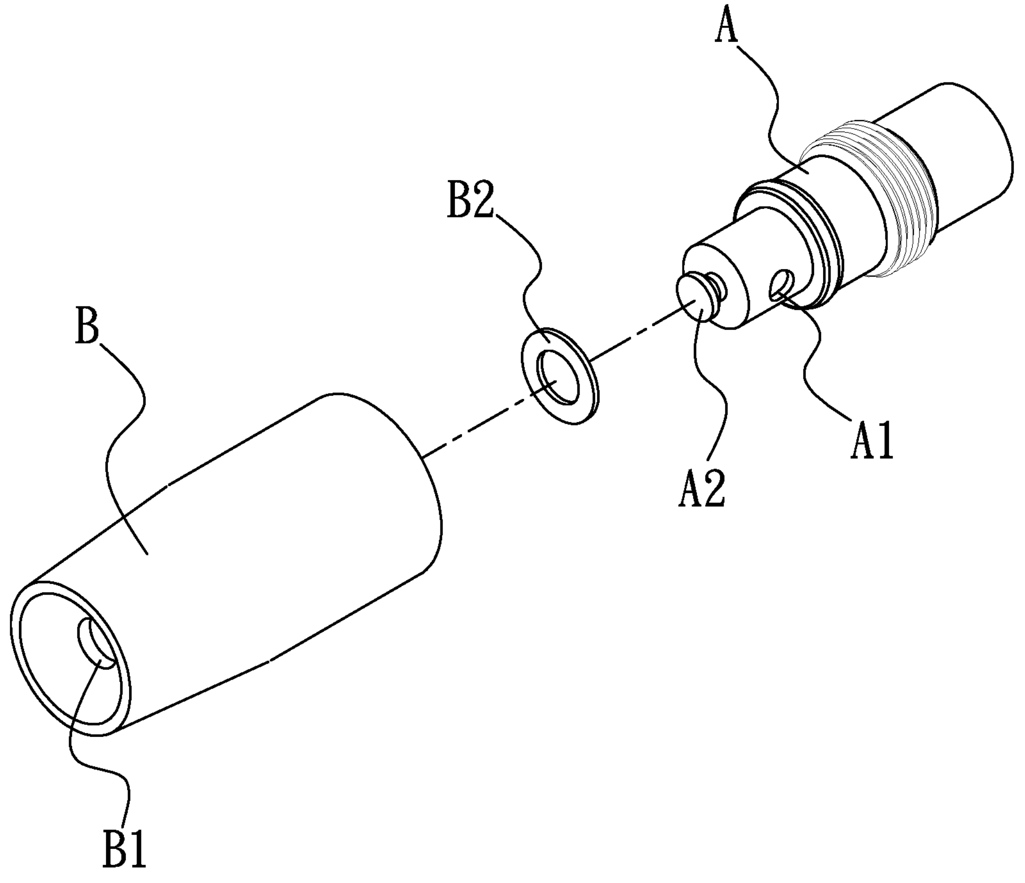
prior art FIG. 1
FIG. 1 is a schematic diagram showing the structure of the conventional nozzle.
Figure 2:
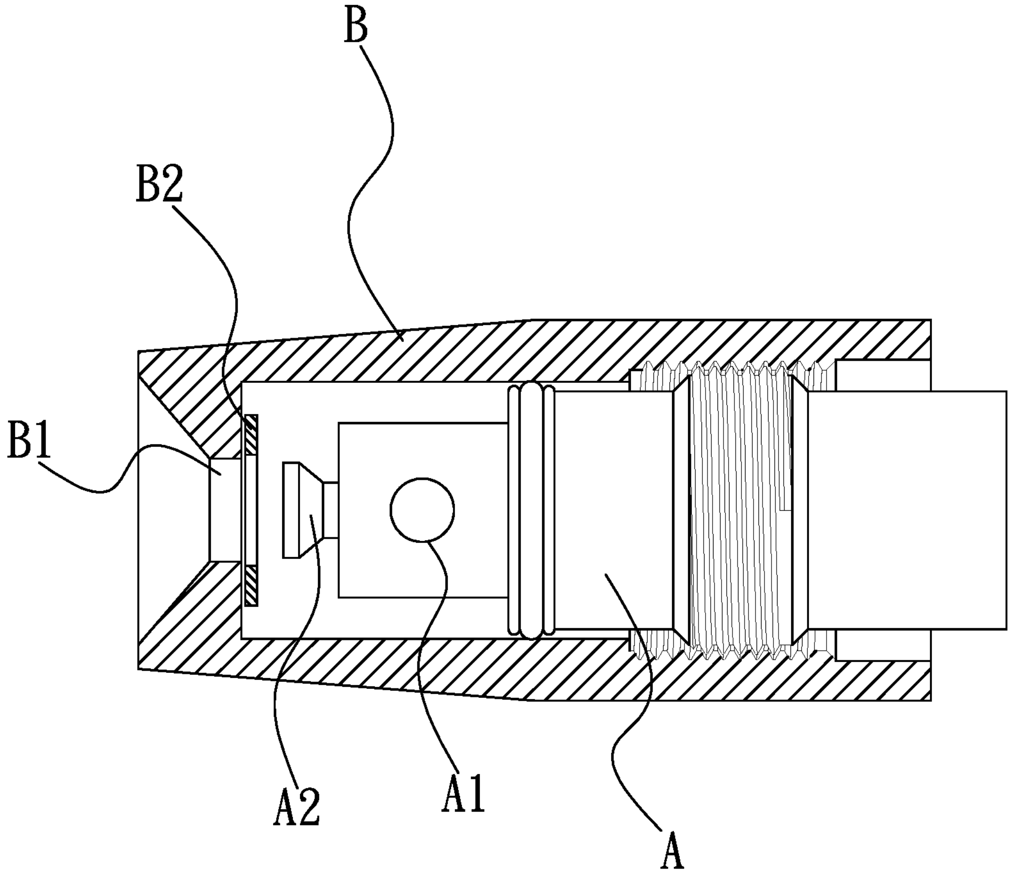
prior art FIG. 2
FIG. 2 is a schematic cross-sectional view of the conventional nozzle.
Figure 3:
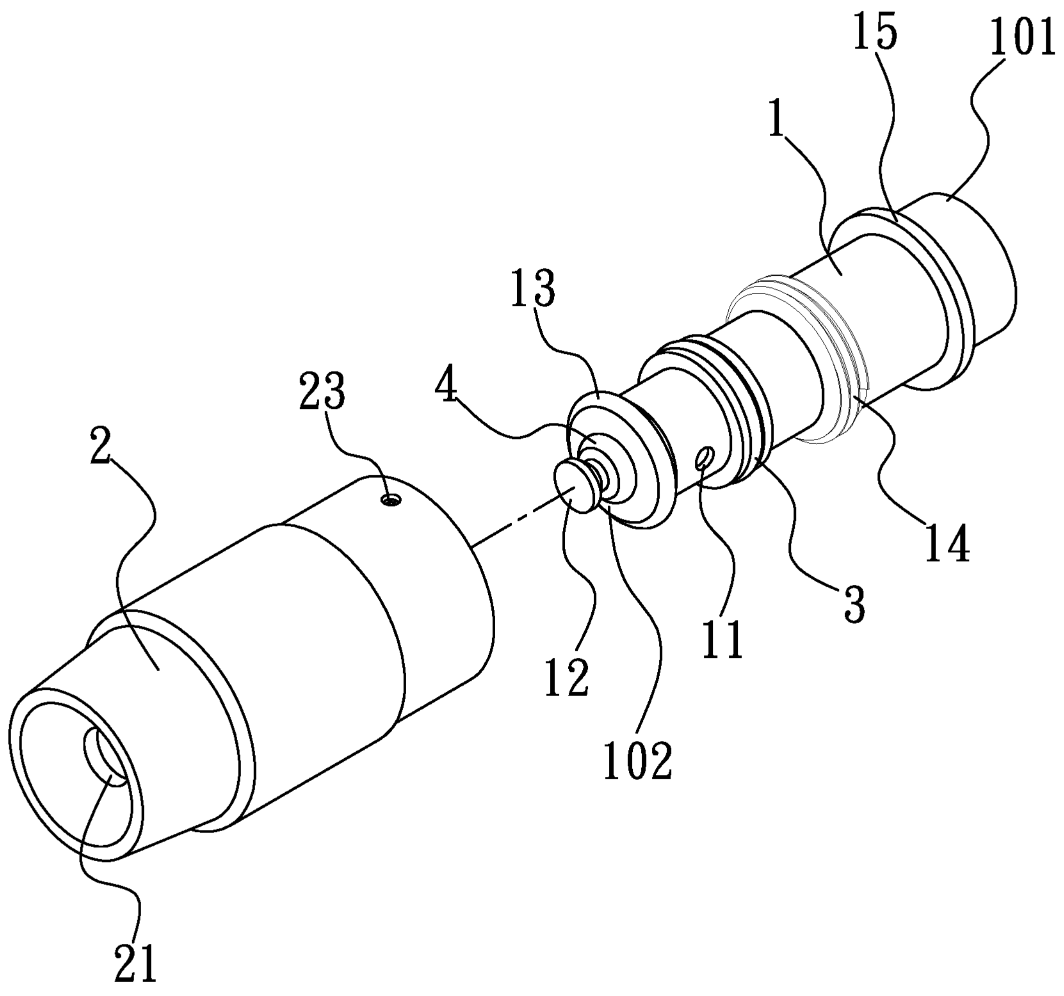
FIG. 3 is a schematic diagram of the structure of the present disclosure.
Figure 4:
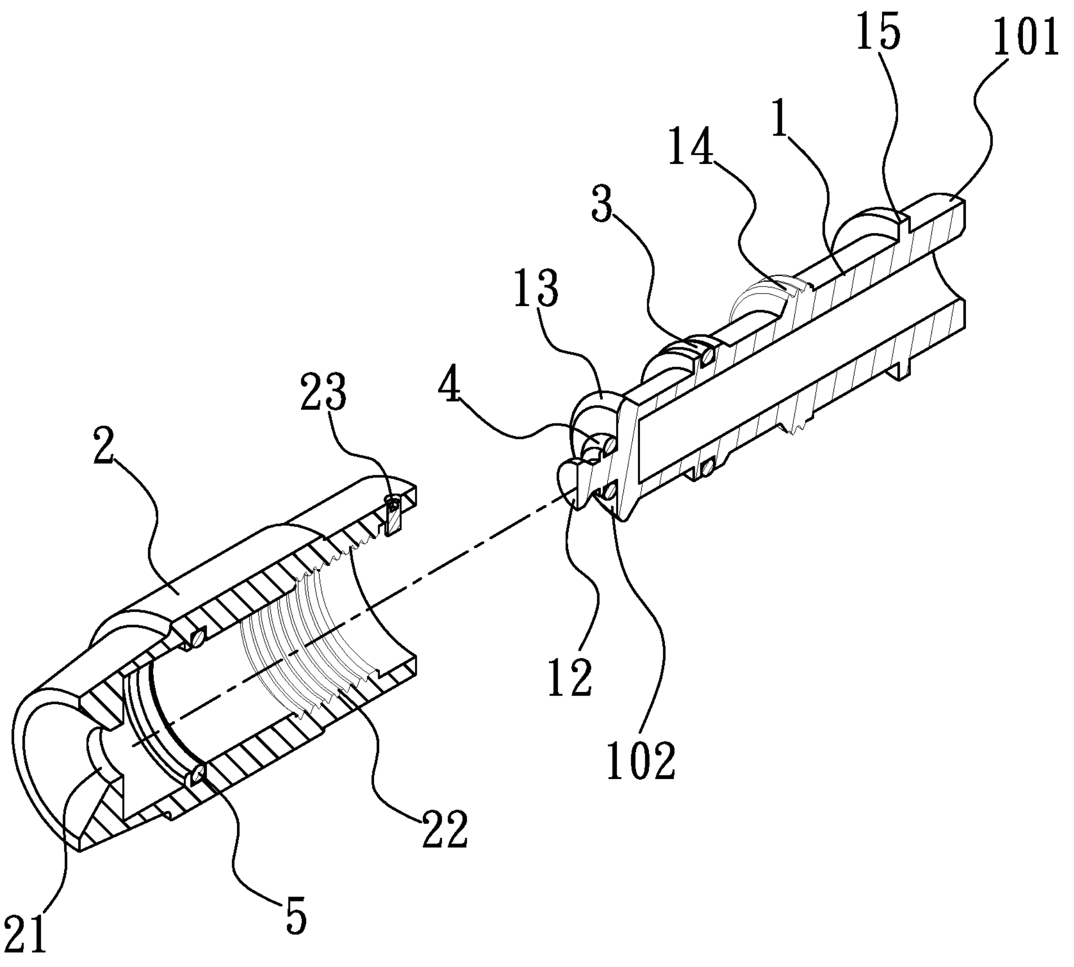
FIG. 4 is a schematic cross-sectional view of the structure of the present disclosure.
Figure 5:
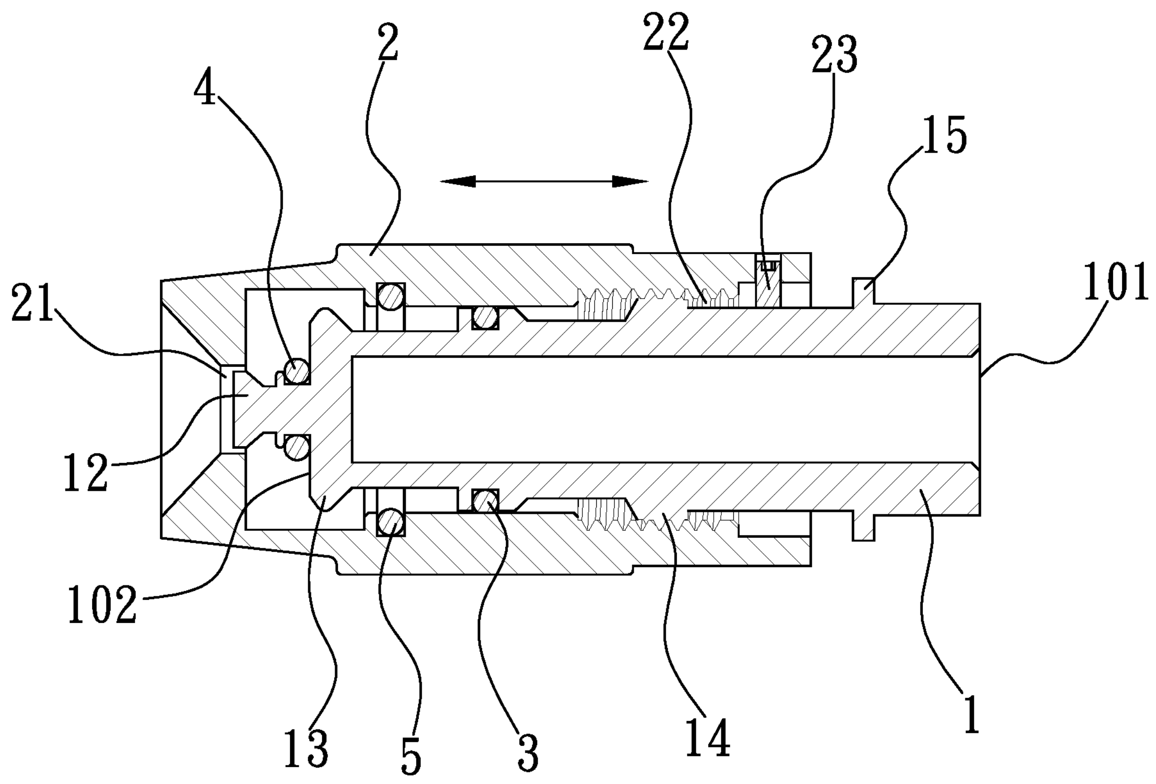
FIG. 5 is a schematic diagram of some embodiment of the present disclosure.

In order to achieve the above or other purposes and efficacy, the technical means and structures employed in the present disclosure are illustrated and described in detail as follows with respect to the preferred embodiments of the present disclosure for a complete understanding of their features and functions.

Referring to FIGS. 3 to 7, which are schematic diagrams of the structure, schematic diagrams of the cross-sectional structure, and schematic diagrams of the preferred embodiment of the present disclosure, as shown in those figures, the present disclosure mainly provides a nozzle structure with forward and reverse water sealing, at least comprising:

- a nozzle head 1, the two ends of which are a water-filling end 101 and a spraying end 102 respectively, the water-filling end 101 can be connected to a water pipeline for filling the water, on the side of the spraying end 102 is pierced with at least one drainage aperture 11 for water output and a guide cone 102 is provided at the upper end of the spraying end 102, the outer periphery at the end portion of the spraying end 102 is convexly provided with a stopper 13, and the outer side of the middle section of the nozzle head is provided with a screwed joint 14;
- a cover 2, which is sleeved on the nozzle head 1, the upper end of the cover 2 is extended through a water spout 21, and the bottom inner side of the cover 2 is provided with another screwed joint 22 that corresponds to the screwed joint 14 of the nozzle head 1, so that the cover 2 can be rotated in the forward or reverse direction when sleeved on the nozzle head 1;

a first sealing ring 3, is set on the nozzle head 1 and is set relatively on the rear of drainage aperture 11 of the spraying end 102, and can be attached to the inner side of the cover 2 to maintain a sealed status between the bottom of the cover 2 and the nozzle head 1;

a second sealing ring 4, is set on the nozzle head 1 and is set relatively between the upper end of the spraying end 102 and the guide cone 12, when the cover 2 on the nozzle head 1 rotates to the forward end, the second sealing ring 4 can be attached to the water spout 21 of the cover 2 correspondingly, so that the upper end of the cover 2 and the spraying end 102 of the nozzle head 1 can be sealed with each other;

a third sealing ring 5, is set on the cover 2 and is set relatively on the inner middle section of the cover 2, when the cover 2 on the nozzle head 1 rotates to the reverse end, the third seal 5 can be attached to the stopper 13 of the nozzle head 1 correspondingly, so that the cover 2 and the spraying end 102 of the nozzle head 1 can be sealed with each other;

wherein, the sealing rings 3, 4, and 5 are made of a resilient waterproof material;

wherein, the sealing rings 3, 4, and 5 are made of natural rubber or synthetic rubber;

wherein, the nozzle head 1 has at least one stopper portion 15 protruding from the outer side of the water-filling end 101, and the stopper portion 15 correspondingly leaned against the bottom end of the cover 2; and wherein, the bottom end of the cover 2 is embedded with at least one stopper piece 23, and the stopper piece 23 correspondingly leaned against the outer side of the screwed joint 14 of the nozzle head 1.

When the present disclosure is in use, any water pipeline can be connected to the water-filling end 101 of the nozzle head 1 to supply the water into the nozzle head 1 and output from the drainage aperture 11 on the spraying end 102 of the nozzle head 1. The cover 2 is sleeved on the nozzle head 1 and can be rotated in the forward or reverse direction to adjust the relative distance between the guide cone 12 of the nozzle head 1 and the water spout 21 of the cover 2. The water flow from the nozzle head 1 drainage aperture 11 is flowing through the guide cone 12, then sprays out from the water spout 21 of the cover 2, so that the water jet from the water spout 21 can be adjusted between scattering and direct jetting states, and when the cover 2 rotates to the forward end or reverse end, the first sealing ring 3 and the second sealing ring 4, or the first sealing ring 3 and the third sealing ring 5, can be sealed at both ends of the cover 2, reach the purpose of sealing the water by rotating the cover 2 to the forward end or reverse end.

In addition, when using the nozzle structure of the present disclosure to spray the water, the user can choose to rotate the cover 2 in a forward or reverse direction according to the spraying state of the water spout 21 and quickly rotate to the forward or reverse end of the nozzle head 1, so that the first and second sealing rings 3 and 4, or the first and third sealing rings 3 and 5 can seal both ends of the cover 2 to achieve the effect of water sealing and water shutting.

Regardless of the state of the water jet from the water spout 21, the first sealing ring 3 on the drainage aperture 11 of the spraying end 102 of the nozzle head 1 has remained close to the inner side of the cover 2, so that the seal between the bottom end of the cover 2 and the nozzle head 1 can be maintained.

Figure 6:
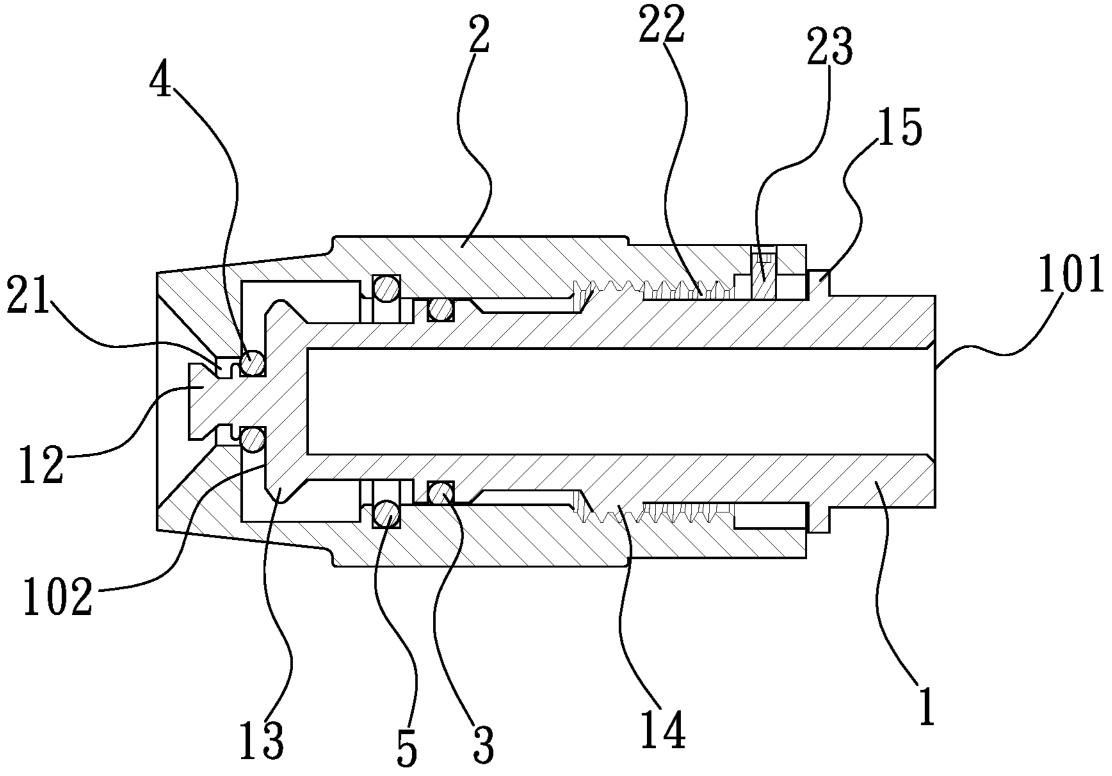
FIG. 6 is a schematic diagram of some embodiment of the present disclosure.

When the water sprayed from the water spout 21 is in a scattering state, the user can turn the cover 2 in the forward direction corresponding to the nozzle head 1 and quickly turn it to the forward end of the nozzle head 1, so that the second sealing ring 4, which is set between the upper end of the spraying end 102 of the nozzle head 1 and the guide cone 12, can attach to and seal with the water spout 21 of the cover 2 (as shown in FIG. 6), seal the top of the cover 2 and the spraying end 102 of the nozzle head 1, and seal the two ends of the cover 2 with the first sealing ring 3 and the second sealing ring 4, so that the cover 2 can achieve the effect of sealing off the water at the forward end position corresponding to the nozzle head 1.

In view of the above and refer to FIG. 6, the stopper portion 15 on the outside of the water-filling end 101 of the nozzle head 1 is leaned against and restrains the bottom end of the cover 2 when the cover 2 is rotated on the nozzle head 1 to the end in the forward direction, and preferably, the stopper portion 15 is a flange rib, flange key or other stopper structure, so that the cover 2 cannot be excessively rotated in the forward direction and prevent the screwed joints 14 and 22 of the nozzle head 1 and the cover 2 from break and damage.

Figure 7:
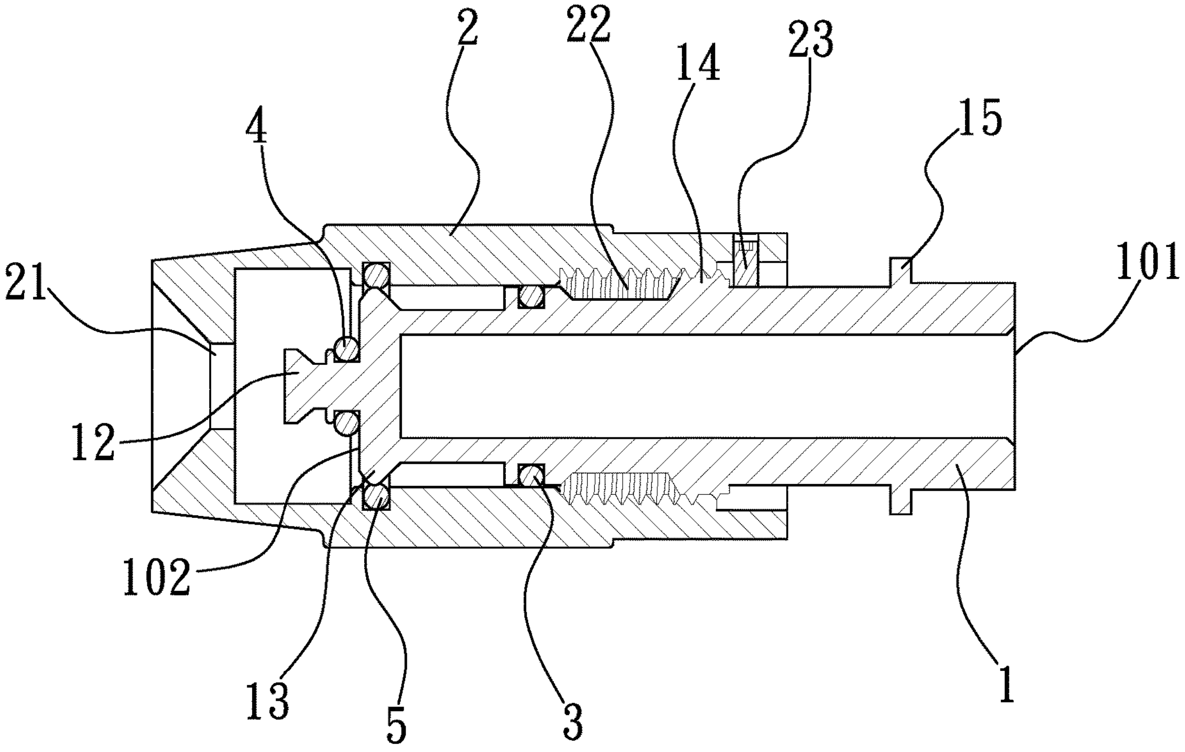
FIG. 7 is a schematic diagram of some embodiment of the present disclosure.

When the water sprayed from the water spout 21 is in a direct-jetting state, the user can turn the cover 2 in the reverse direction corresponding to the nozzle head 1 and quickly turn it to the reverse end of the nozzle head 1, so that the third sealing ring 5, which is set in the inner middle section of the cover 2, can attach to and seal with the stopper 13 around the spraying end 102 of the nozzle head 1 (as shown in FIG. 7), and seal the cover 2 and the spraying end 102 of the nozzle head 1, and seal the two ends of the cover 2 with the first sealing ring 3 and the third sealing ring 5, so that the cover 2 can achieve the effect of sealing off the water at the reverse end position corresponding to the nozzle head 1.

In view of the above and refer to FIG. 7, the stopper piece 23 embedded in the bottom end of the cover 2 is leaned against and restrains the outer side of the screwed joint 14 of the nozzle head 1 when the cover 2 is rotated on the nozzle head 1 to the end in the reverse direction, and preferably, the stopper piece 23 is a bolt or other structure that can be embedded for being a stopper, so that the cover 2 cannot be excessively rotated in the reverse direction to prevent the cover 2 from falling off from the nozzle head 1.

In addition, even if the user is not familiar with the nozzle structure of the present disclosure, also can rotate the cover 2 to the end in either direction on the nozzle head 1, so that the first sealing ring 3 and the second sealing ring 4 (or the first sealing ring 3 and the third sealing ring 5) can seal the two ends of the cover 2, stop the water flow for spraying and achieve the effect of easy to use.

In summary, compared to the various shortcomings and unsolvable problems of the nozzle of conventional sprinklers, the present disclosure uses a special design of nozzle head 1, cover 2, first sealing ring 3, the second sealing ring 4, and third sealing ring 5, so that the cover 2 can be optionally rotated to the end corresponding to the nozzle head 1 in the forward direction or the reverse direction, and quickly seals the two ends of the cover 2 to stop the water, so as to achieve the efficacy and purpose of easy use.

However, the above is only the preferred embodiment of the present disclosure, and it does not limit the scope of the patent of the present disclosure. Therefore, all simple modifications and equivalent structural changes made by applying the contents of the specification and drawings of the present disclosure shall be included in the scope of the patent of the present disclosure.

What is claimed is:

1. A nozzle structure with forward and reverse water sealing, at least comprising:

a nozzle head, the two ends of which being a water-filling end and a spraying end respectively, the water-filling end being connected to a water pipeline for filling the water, on a side of the spraying end being pierced with at least one drainage aperture for water output and a guide cone being provided at an upper end of the spraying end, an outer periphery at an end portion of the spraying end being convexly provided with a stopper, and an outer side of a middle section of the nozzle head being provided with a screwed joint;

a cover, which is sleeved on the nozzle head, an upper end of the cover being extended through a water spout, and a bottom inner side of the cover being provided with another screwed joint that corresponds to the screwed joint of the nozzle head, so that the cover is rotated in the forward or reverse direction when sleeved on the nozzle head;

a first sealing ring, being set on the nozzle head and being set relatively on a rear of the drainage aperture of the spraying end, and being attached to an inner side of the cover to maintain a sealed status between the bottom of the cover and the nozzle head;

a second sealing ring, being set on the nozzle head and being set relatively between the upper end of the spraying end and the guide cone, when the cover on the nozzle head rotates to a forward end, the second sealing ring being attached to the water spout of the cover correspondingly, so that the upper end of the cover and the spraying end of the nozzle head are sealed with each other; and a third sealing ring, being set on the cover and being set relatively on an inner middle section of the cover, when the cover on the nozzle head rotates to a reverse end, the third sealing ring being attached to the stopper of the nozzle head correspondingly, so that the cover and the spraying end of the nozzle head are sealed with each other;

wherein, the forward end and the reverse end together define a movement direction of the cover, the stopper is protruding in a direction perpendicular to the movement direction and is positioned between the first sealing ring and the second sealing ring along the movement direction;

wherein, the radial length of the first sealing ring is smaller than the radial length of the third sealing ring and greater than the radial length of the second sealing ring;

wherein, when the second sealing ring is attached to the water spout of the cover, the first sealing ring maintains the sealed status between the bottom end of the cover and the nozzle head, the third sealing ring is not attached to the stopper of the nozzle head, and the water output from the at least one drainage aperture on the side of the spraying end is sealed by the first sealing ring, the second sealing ring and the cover;

wherein, when the third sealing ring is attached to the stopper of the nozzle head, the first sealing ring maintains the sealed status between the bottom end of the cover and the nozzle head, the second sealing ring is not attached to the water spout of the cover, and the water output from the at least one drainage aperture on the side of the spraying end is sealed by the first sealing ring, the third sealing ring and the cover;

wherein, when only the first sealing ring maintains the sealed status between the bottom end of the cover and the nozzle head, the at least one drainage aperture on the side of the spraying end is fluid communication with the water spout of the cover.

2. The nozzle structure with forward and reverse water sealing according to claim 1, wherein the sealing rings are made of a resilient waterproof material.

3. The nozzle structure with forward and reverse water sealing according to claim 1, wherein the sealing rings are made of natural rubber or synthetic rubber.

4. The nozzle structure with forward and reverse water sealing according to claim 1, wherein the nozzle head has at least one stopper portion protruding from an outer side of the water-filling end, and the stopper portion correspondingly leaned against a bottom end of the cover.

5. The nozzle structure with forward and reverse water sealing according to claim 1, wherein a bottom end of the cover being embedded with at least one stopper piece, and the stopper piece correspondingly leaned against an outer side of the screwed joint of the nozzle head.

* * * * *